2,915,880

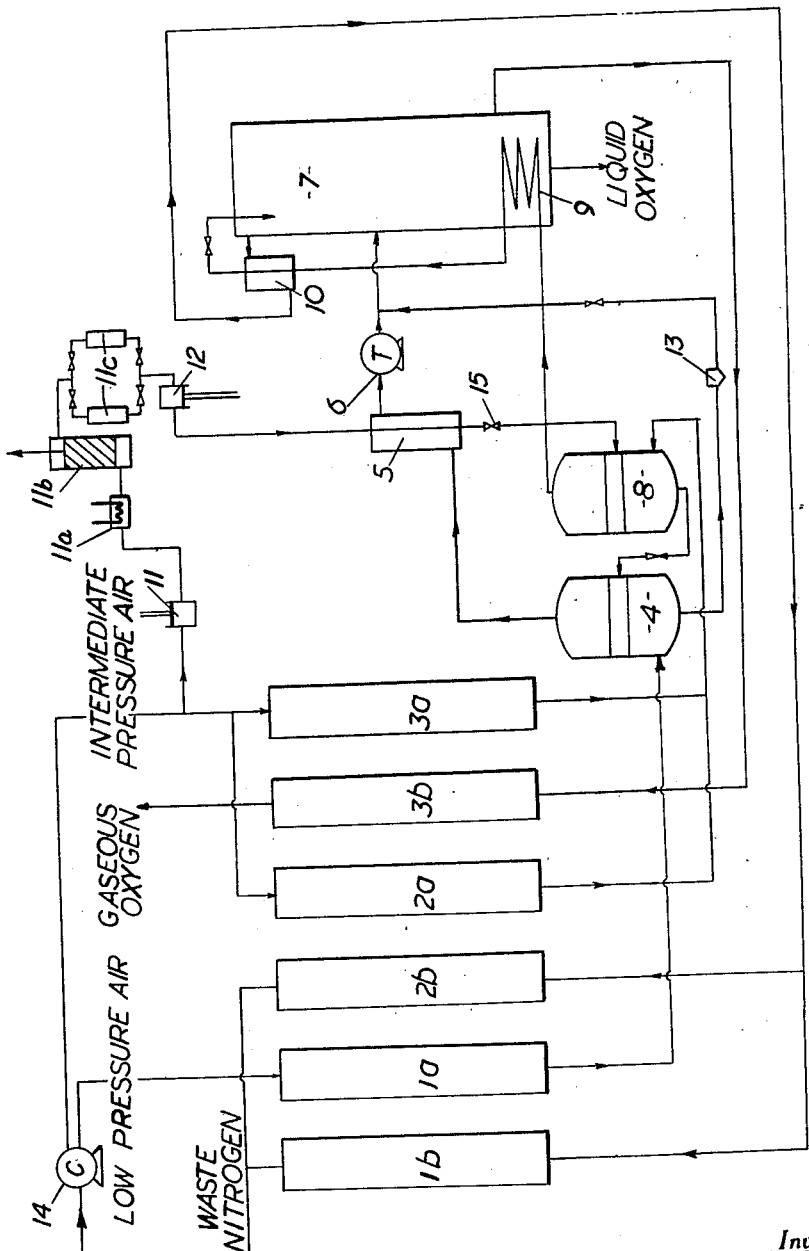

SEPARATION OF GAS MIXTURES

Paul Maurice Schuftan, Richmond Hill, and John Neill, Wolverhampton, England, assignors to The British Oxygen Company Limited, a British company Application May 11, 1956, Serial No. 584,277

Claims priority, application Great Britain May 12, 1955

4 Claims. (Cl. 62—13)

The present invention relates to the separation of gas mixtures by liquefaction and subsequent rectification and more particularly to a separation process of this type in which the initial gas mixture after compression is cooled by heat exchange with one or more of the cold separation products in regenerators or reversible heat exchangers.

As is well known, regenerators or reversible heat exchangers serve also to purify the gas mixture by freezing out from it any readily condensible impurities. For example, in the case of air separation, the water and carbon dioxide in the incoming air are condensed and frozen out on the regenerator or exchanger matrix in the warm period and during the subsequent cold period are evaporated or sublimed into the outgoing separation products. In this way, separate purification of the air is made unnecessary.

For satisfactory operation it is necessary that the material deposited during the warm period be completely removed during the cold period; if this were not so, the regenerators or exchanger would soon become completely blocked with deposit. Owing to the temperature difference between the incoming warm gas mixture and the cold separation products at any point in the regenerator or exchanger, the deposits will not be completely removed unless steps are taken to ensure that the heat capacity of the cold product stream is not less than that of the incoming warm gas stream and that the volume of the cold product stream is greater than that of the main gas stream. This operation is termed "balancing."

It has previously been proposed to effect balancing by introducing into the separation plant a subsidiary stream of gas which has been cooled and purified by some means other than the regenerators or reversing exchanger. This stream hereinafter termed the "balancing stream" then serves to augment the quantity of separation products returning through the regenerators or reversible exchanger.

According to the invention, a gas separation process of the type specified comprises producing the balancing stream by compressing to a relatively high pressure a minor part of the gas mixture with cooling to ambient temperature and removal of condensible impurities, isentropically expanding (as hereinafter defined) the whole of such compressed balancing stream, and subjecting the expanded balancing stream to rectification in conjunction with the major portion of the gas mixture which has been cooled in the regenerators or reversible heat exchangers.

The term "isentropic expansion" as used herein implies expansion in a machine with the recovery of external work and the production of cold and is to be understood to include the entropy increase inevitably resulting from the imperfections known to exist in all such machines.

As distinct from previous methods, the balancing stream as produced by the process of the present invention makes it possible to derive a part of the cold requirements for the process in a highly efficient manner as the whole of it is isentropically expanded. The amount of a gas mixture to be diverted to produce the balancing stream and the pressure to which such stream is compressed are determined by the magnitude of the cold losses and by the necessity or otherwise of recovering separation products at least partially in the liquid state. In cases where a separation product is to be recovered in the liquid state, the amount of gas diverted to the balancing system must be augmented by an amount equivalent to that withdrawn as liquid.

As applied to the separation of air, the balancing stream is produced by compressing to a relatively high pressure a minor part of the air to be separated with removal of water vapour and carbon dioxide as condensible impurities, isentropically expanding the whole of such compressed balancing air and subjecting it to rectification in conjunction with the major portion of the air which has been cooled in the regenerators or reversible exchangers.

The isentropic expansion of the balancing stream can be effected either in a turbine or reciprocating engine.

The balancing stream after expansion but prior to its entry into the rectification zone, may serve other purposes in the separation cycle. For example, where a part of the gas mixture to be separated is expanded into the rectification zone through a turbine, the balancing stream may conveniently be used to provide the preheating of the gas stream prior to its passage through the turbine; this step is necessary to prevent condensation in the turbine.

Again, where residual impurities are removed from the gas stream leaving the regenerators or reversible exchangers by washing with a stream of liquefied gas followed by filtration of the liquid, the balancing stream may be used to provide liquid for this purpose.

A further advantage of the present invention is that the pressure and volume flow of the balancing stream can be easily adjusted and by this means the ratio of liquid produced to gas produced can be varied, thus increasing the flexibility of the plant.

By way of example the invention will now be more particularly described with reference to the accompanying drawing, which illustrates diagrammatically the invention as applied to an air separation process to produce a gaseous oxygen and a gaseous nitrogen fraction.

For the sake of clarity and to avoid undue elaboration of the description several features for carrying the process into effect, which are well known per se to those skilled in the art, have been omitted from the drawings. It will be appreciated, for example, that the temperature of the waste nitrogen must be adjusted before entering the regenerators and that a change-over valve mechanism has to be provided for sets of associated regenerators. Such features are well known and have been omitted in the interests of simplicity. In the drawing regenerators are shown as alternating heat exchangers and each pair of associated regenerators bears the same reference numeral and are marked respectively (a) or (b), the suffix (a) being applied to the cooling regenerator and (b) to the generator which is in the course of being cooled.

Direction of flow along the interconnecting pipe work is everywhere shown by arrows.

By the term "equaliser" as used herein, is means an apparatus for bringing into intimate contact vapour and liquid streams, in order to smooth out fluctuations in the vapour temperature and to scrub the vapour with the liquid thus removing impurities from the vapour.

It is to be understood that the term regenerator is intended to include reversible heat exchangers.

The air entering the plant is compressed in a compressor 14 and divided into two major streams, one at about 2.6 atma. (hereinafter called low pressure air), the other at about 4.8 atma. (hereinafter called intermediate pressure air).

The low pressure air is cooled in regenerator 1a to a temperature near its liquefaction point and is scrubbed with liquid air in an equaliser 4. In this way the low pressure air is brought to the dew point and residual impurities are removed. The vapour leaving the equaliser is heated in an exchanger 5, subjected to isentropic expansion in a turbine 6, and fed into a rectification column 7 at an intermediate point. The liquid air leaving the equaliser is filtered in filter 13 and passed into the rectification column 7 at about the same point.

The intermediate pressure air is cooled in a similar manner in regenerators 2 and 3 and scrubbed with liquid air in an equaliser 8. The intermediate pressure air vapour leaving the equaliser is condensed in a condenser 9 by indirect heat exchange with boiling oxygen in the column 7 and the resultant liquid sub-cooled in a sub-cooler 10 before expansion into the top of the column 7, where it serves as liquid reflux for the separation. The liquid air leaving the equaliser 8 is passed to the equaliser 4.

A small fraction of the intermediate pressure air is diverted before the regenerators, compressed to a high pressure in a compressor 11, cooled to ambient temperature in an aftercooler 11a, freed from carbon dioxide in a carbon dioxide removal tower 11b, dried in one of a pair of alternating driers 11c, and expanded in an expansion engine 12. The relatively cold expanded high pressure air from the engine is further cooled and partially liquefied in enchanger 5 by heat exchange with the low pressure air and expanded through a valve 15 into the equaliser 8 where it serves to scrub the intermediate pressure air from the regenerators.

The expanded high pressure air may, if desired, also be used to perform other duties, such as heating the waste nitrogen passing to the regenerators.

The air streams entering the column 7 are separated into the required waste nitrogen and gaseous oxygen products. The waste nitrogen leaving the column is warmed in the sub-cooler 10 and heated to substantially atmospheric temperature in the regenerators 1b and 2b. A gaseous oxygen fraction is withdrawn from the column and similarly heated in regenerator 3b. Any liquid oxygen produced is extracted from the column sump and passed to storage.

With the process as described above, the necessary excess of separation products returning back through the regenerators is achieved and the regenerators balanced. The quantity of high pressure air is adjusted according to the amount of liquid products produced. In addition, the expanded high pressure air performs the functions of turbine preheating and is a source of liquid for scrubbing the gas streams leaving the regenerators.

While the above described example uses a single rectification column, it will be appreciated that the present invention can be equally applied to a system using a conventional double column.

We claim:

1. The method of separating a gas mixture into a lower boiling point fraction and a higher boiling point fraction which comprises compressing the gas mixture, dividing said compressed gas mixture into a major and a minor stream, compressing said minor stream to a pressure substantially higher than that of said major stream, cooling said compressed minor stream to ambient temperature, and removing condensible impurities therefrom, isentropically expanding the whole of said minor stream, cooling said major stream by heat exchange with at least one of the cold separation products, heating at least a part of said cooled major stream by heat exchange with said expanded minor stream, expanding said heated part of said major stream in a turbine, subjecting both the major and the minor stream to rectification in a rectification zone and withdrawing from said rectification zone a lower boiling point fraction and a higher boiling point fraction.

2. The method of separating a gas mixture into a lower boiling point fraction and a higher boiling point fraction which comprises compressing the gas mixture, dividing said compressed gas mixture into a major and a minor stream, compressing said minor stream to a pressure substantially higher than that of said major stream, cooling said compressed minor stream to ambient temperature, and removing condensible impurities therefrom, isentropically expanding the whole of said minor stream, cooling said major stream by heat exchange with at least one of the cold separation products, heating a part of said cooled major stream by heat exchange with said expanded minor stream, whereby said expanded minor stream is cooled and partially condensed, expanding said heated part of said major stream in a turbine, expanding said cooled minor stream, washing the remainder of said major stream with the condensed part of said minor stream to remove residual impurities from said remainder of said major stream, filtering said condensed part of said minor stream to remove said residual impurities, subjecting the whole of both the major and minor streams to rectification in a rectification zone, and withdrawing from said rectification zone a lower boiling point fraction and a higher boiling point fraction.

3. The method of separating air into an oxygen fraction and a nitrogen fraction which comprises compressing the air, dividing said compressed air into a major and a minor stream, compressing said minor stream to a pressure substantially higher than that of said major stream, cooling said compressed minor stream to ambient temperature, and removing carbon dioxide and water therefrom, isentropically expanding the whole of said minor stream, cooling said major stream by heat exchange with at least one of the cold separation products, heating at least a part of said cooled major stream by heat exchange with said expanded minor stream, expanding said heated part of said major stream in a turbine, subjecting both said major and said minor stream to rectification in a rectification zone and withdrawing from said rectification zone a nitrogen fraction and an oxygen fraction.

4. The method of separating air into an oxygen fraction and a nitrogen fraction which comprises compressing the air, dividing said compressed air into a major and a minor stream, compressing said minor stream to a pressure substantially higher than that of said major stream, cooling said compressed minor stream to ambient temperature, and removing carbon dioxide and water therefrom, isentropically expanding the whole of said minor stream, cooling said major stream by heat exchange with at least one of the cold separation products, heating a part of said cooled major air stream by heat exchange with said expanded minor stream, whereby said expanded minor stream is cooled and partially condensed, expanding said heated part of said major stream in a turbine, expanding said cooled minor stream, washing the remainder of said major stream with the condensed part of said minor stream to remove residual impurities from the said remainder of said major stream, filtering said condensed part of said minor stream to remove said residual impurities therefrom, subjecting the whole of both the major and minor streams to rectification in a rectification zone, and withdrawing from said rectification zone a nitrogen fraction and an oxygen fraction.

References Cited in the file of this patent

UNITED STATES PATENTS

| | | |
|---|---|---|
| 2,355,660 | Le Rouge | Aug. 15, 1944 |
| 2,664,719 | Rice | Jan. 5, 1954 |
| 2,668,425 | Skaperdas | Feb. 9, 1954 |
| 2,699,047 | Karwat | Jan. 11, 1955 |
| 2,712,738 | Wucherer | July 12, 1955 |

FOREIGN PATENTS

| | | |
|---|---|---|
| 473,873 | Italy | Aug. 18, 1952 |